Sept. 12, 1961 W. C. SWARTZ 2,999,902

AUTOMATIC TELEPHONE DIALER

Filed July 12, 1956 3 Sheets-Sheet 1

INVENTOR.

WALTER C. SWARTZ

BY William T. Seovald

ATTORNEY

AUTOMATIC TELEPHONE DIALER

Filed July 12, 1956 3 Sheets-Sheet 2

FIG. II

INVENTOR.
WALTER C. SWARTZ
BY William P. Sevald
ATTORNEY

Sept. 12, 1961 W. C. SWARTZ 2,999,902

AUTOMATIC TELEPHONE DIALER

Filed July 12, 1956 3 Sheets-Sheet 3

INVENTOR.
WALTER C. SWARTZ
BY William P. Seeald
ATTORNEY

United States Patent Office 2,999,902
Patented Sept. 12, 1961

2,999,902
AUTOMATIC TELEPHONE DIALER
Walter C. Swartz, 1985 Beverly Ave., Berkley, Mich.
Filed July 12, 1956, Ser. No. 597,510
1 Claim. (Cl. 179—90)

This invention relates to automatically variable movement devices and particularly pertains to a device for dialing telephone numbers automatically.

Automatic devices for dialing telephone numbers have been employed heretofore to facilitate dialing a telephone number without manual operation, however, the several devices of the prior art have not proven entirely satisfactory inasmuch as they are complicated in design and construction, expensive to manufacture, difficult to attach, difficult to use, and difficult to maintain in working order.

With the foregoing in view, the primary dbject of the invention is to provide an automatic variable movement device for dialing telephone numbers automatically which is simple in design and construction, inexpensive to manufacture, easy to attach, easy to use, easy to maintain and repair, and which can easily be disconnected to permit manual dialing if so desired.

An object of the invention is to provide a device for automatically dialing telephone numbers which can be manufactured inexpensively as the component parts are easily made and the assembly of parts readily accomplished.

An object of the invention is to provide an automatic telephone dialing device which can be operated with ease by a professional operator or an ordinary user.

An object of the invention is to provide an automatic telephone dialing device which can be fitted to all sizes of telephones without changes in its assembly or arrangement of parts.

An object of the invention is to provide an automatic device for dialing telephones which terminates its operation upon the number being dialed without further manual operation by the user.

These and other objects of the invention will become apparent by reference to the following description of an automatic device for dialing a telephone number embodying the invention taken in connection with the accompanying drawings in which.

Figure 1:
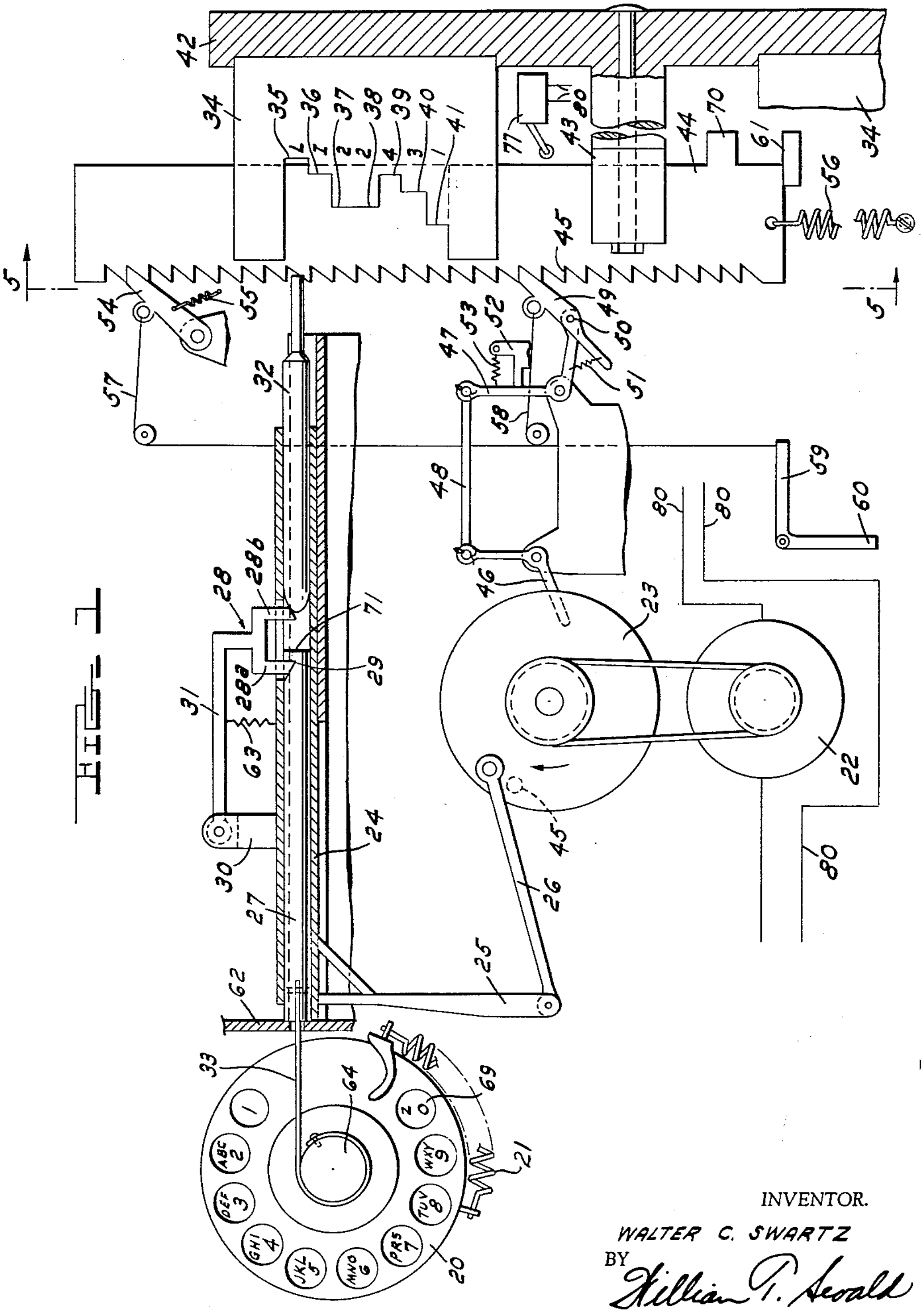
FIG. 1 is a plan view, partially schematic and partly in cross-section, of the device seen at the beginning of the movement of winding the dial in dialing a telephone number digit.

Referring now to the drawings wherein like numerals refer to like and corresponding parts throughout the several views, the device disclosed therein to illustrate the invention comprises a spring return telephone dial 20 having indicia thereon corresponding ot the digits of telephone numbers, a magazine 42 having stops 34 punched or slotted to correspond to particular phone numbers which magazine 42 is mounted on the closs slide 44 so as to be incrementally advanceable in timed relation to the action of the intermediate mechanism which cranks the telephone dial 20 as tripped by a stop 34.

More particularly, the telephone dial 20 has a spring 21 for returning the dial 20 counter-clockwise to the initial position after it has been rotated clockwise manually or otherwise to dial a phone number digit, a motor 22 adapted to drive the crank wheel or arm 23, a reciprocating member 24 having an extending arm 25 which is connected to the crank arm or wheel 23 via the connecting rod 26 so that as the motor rotates the wheel or crank arm 23, the member 24 is reciprocated back and forth via the connecting rod 26 and it is obvious that the reciprocating movement of the reciprocating member 24 is thereby powered in both directions.

The slide plunger 27 is slidably disposed on the member 24 and connected to the telephone dial hub 64 by the flexible band 33 so that upon movement of the slide plunger 27 to the right as seen in the drawings, the dial 20 is rotated clockwise to dial a phone number digit and the power of the reciprocating member 24 is transferred to the slide plunger 27 via the tang 28 which fits in the ratchet notch 29 of the slide plunger 27 and it is to be noted that the tang 28 is mounted on the leg 31 which is pivotally attached to the bracket 30 carried by the reciprocating member 24.

It can now be seen from the elements so far described that upon 180° movement of the crank wheel 23, the reciprocating member 24 will move to the right as seen in the drawings and carry with it the slide plunger 27 via the tang leg 28A so that the slide plunger 27 movement winds the phone dial 20 clockwise against the power of the spring 21 and when the plunger 27 is moved all the way to the right with the reciprocating member 24, it dials the "Operator" or "Zero" on the dial 20 with the dial 20.

To terminate the travel of the slide plunger 27 with the reciprocating slide 24 in the movement to the right as seen in the drawings at a point to dial desired phone number digits between "1" and "zero," a cam plunger 32 is slidably disposed on the reciprocating member 24 and is adapted to abut the tang leg 28B at the desired point of travel of the slide plunger 27 so as to lift or move the tang 28 relative to the reciprocating member 24 and slide plunger 27 to move the tank leg 28A out of the notch 29 to disconnect the reciprocating member 24 from the slide plunger 27 and then and at that point, the slide plunger 27 moves to the left as seen in the drawings under the drag furnished by the spring 21 of the dial 20 via flexible member 35 and the dial 20 then winds counter-clockwise to register the digit dialed.

A multiple face stop 34 is provided for abutting the cam plunger 32 at the desired point so as to activate the cam plunger 32 to move the tang 28 to disconnect the slide plunger 27 from further movement to the right with the reciprocating member 24; the multiple face stop 34 is equipped with stop faces 35–41 and for purposes of illustration the faces 35–41 are coordinated as to depth to give relative movement to the dial 20 corresponding to the arbitrary telephone number "LIncoln 2–2431" so that when the cam plunger 32 moves a distance to the right as seen in the drawings so as to contact the first face 35, it does not become activated to move the tang 28 out of the notch 29 until the dial 20 has been rotated to the digit "L." The stops 36–41 are correlated to the remaining digits of the illustrative number and are adapted to be sequentially dialed as hereinafter explained.

The key punched stop 34 is carried by the annular magazine 42 which holds a multiplicity of stops 34 having multiple faces coordinated to the digits of various phone numbers and it is to be noted that the magazine 42 is pivotally mounted on the bracket 43 carried by the cross slide 44 which is equipped with ratchet notches 45 coordinated to the interspacing of the faces 35–41 when the cross slide is moved relative to the cam plunger it moves one stop face distance so as to present the next stop face 35–41 to the plunger 32.

To incrementally and sequentially move the stop faces 35–41 of the stop 34 relative to the stop plunger 32, dog 45 is carried by the crank arm or wheel 23 and is adapted to contact the bell crank 46 which is connected to the bell crank 47 via the connecting rod 48 so as to urge the pawl 49 upwardly as seen in the drawing, one increment coordinated to the distance between the stop faces 35–41 and it is to be noted that the pawl 49 is pivotally mounted as at 50 and that the spring 51 holds the pawl 49 in engagement with the ratchet 45. A stop 52 is provided for the bell crank 47 and the spring 53 is adapted to urge the bell crank 47 against the stop 52 so as to reposition the bell crank 46 via the connecting rod 48 for the next engagement with the dog 45, and it is obvious that the spring 53 is adapted to yield to the motion initiated by the dog 45 in the opposite direction. A pawl keeper 54 is urged into engagement with the ratchet 45 by the spring 55 and this pawl allows the passing of the ratchet teeth 45 relative thereto in a direction upwardly as seen in the drawing and holds the cross slide 44 against the spring 56 urging the cross slide 44 downwardly as seen in the drawing; both the activating pawl 49 and the keeper pawl 54 are releasable from the ratchet 45 by means of flexible pull wires 57 and 58 which are connected to the pawls 54 and 49 respectively at one end thereof and to the lever 59 at the other end thereof so that by moving the handle 60 to the left as seen in the drawings, the pull wires 57 and 58 draw the pawls 54 and 49 respectively away from the ratchet 45 so as to permit the spring 56 to return the cross slide 44 to its initial position adjacent the stop 61.

The magazine 42 is rotatably mounted relative to the bracket 43 so as to permit any of the multifaced stops 34 to be placed in operative position relative to the cam plunger 32 and each stop 34 has different stop faces thereon space wise and incrementally coordinated to represent different and various telephone numbers.

Figures 3, 4, 5:
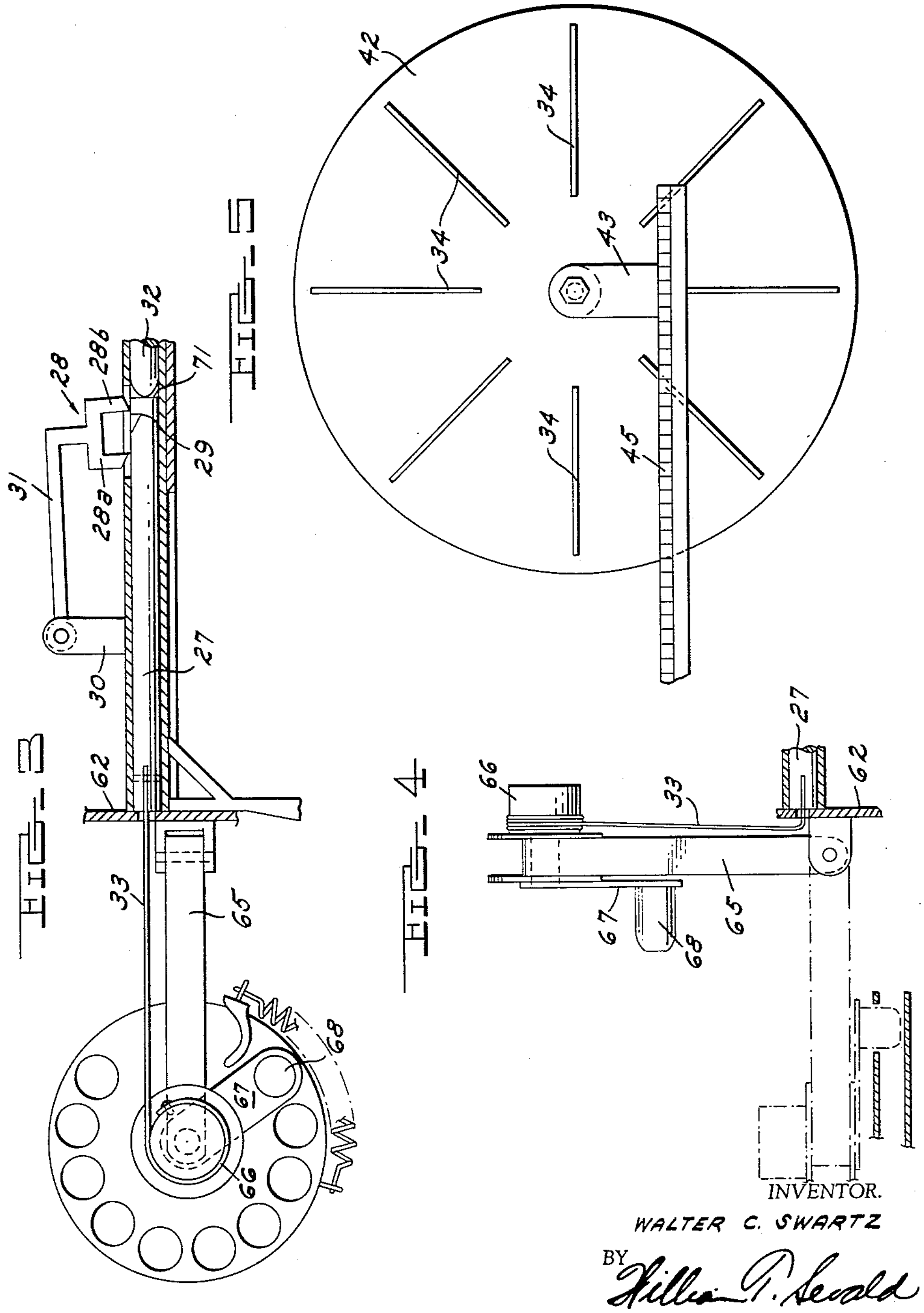
FIG. 3 is a view similar to FIGS. 1 and 2 showing the device in position upon resetting to again initiate the dialing and also illustrating an optional phone dial connection mechanism.
FIG. 4 is a view at right angles of the connection mechanism seen in FIG. 3 showing same in the optional disconnected position.
FIG. 5 is a cross-sectional view of FIG. 1 taken on the line 5—5 thereof showing the magazine containing the various key punch stops coordinated to and indexed relative to various telephone numbers.

A stop 62 is provided adjacent the telephone dial adapted to abut the slide plunger 27 upon travel to the left of the reciprocating member 24 providing the slide plunger 27 with a reaction point to resist movement by frictional engagement with the member 24 so that, FIG. 3, when the reciprocating member 24 has been returned to its farthest point to the left, the tang 28 is by-passed by the end 71 and the notch 29 of the slide plunger 27 and the end of the slide plunger 27 contacts and repositions the cam plunger 32 beyond its point of engagement with the tang leg 28B so that when the reciprocating member 24 again moves to the right, the tang leg 28A moves into the notch 29 via the power of the spring 63 or gravity so that the cam plunger 32 will not be in the position to engage the leg of tang 28B, and, upon further movement of the reciprocating member 24 to the right with the leg 28A of the tang engaging the notch 29, the slide plunger 27 will be carried to the right until the cam plunger 32 again engages one of the stop faces 35–41, whereupon the tang leg 28A will be removed from the notch 29 and the slide plunger 27 released so as to travel with the flexible member 23 under the power of the spring 21 to permit the dial 20 to register the dialed phone number digit.

Figure 2:
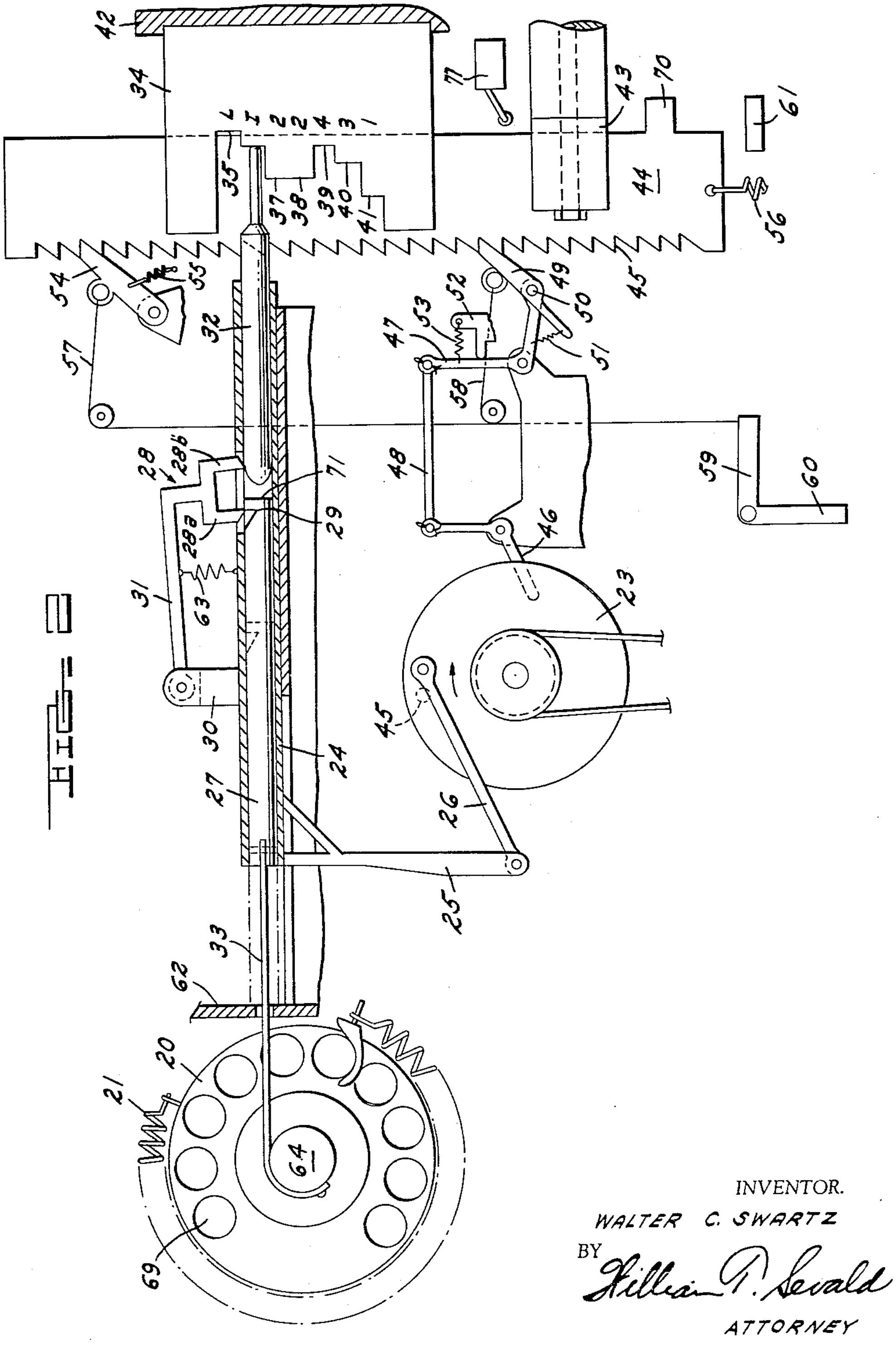
FIG. 2 is a view similar to FIG. 1 showing the condition of the device when the dial is about to unwind.

In the embodiments of FIGS. 1 and 2, a hub 64 is provided on the dial 20 about which the flexible member 33 is wound and attached, whereas in FIGS. 3 and 4, the dialing connection to the phone is via the pivotally mounted arm 65 which is mounted adjacent the stop 62 and which is equipped with a hub 66 about which the flexible member 33 is wound; the arm 67 is fixedly attached to the hub 64 and is provided with a cylindrical wheel 68 which is adapted to be removably inserted in the aperture 69 of the dial 20 so that upon movement of the slide plunger 27 to the right as seen in FIG. 3 of the drawing the flexible member 33 rotates the hub 66 whereupon the arm 67 is swung carrying the wheel 68 secured in the aperture 69 so as to rotate the dial 20 the desired distance as limited by the stop 34 disconnecting the power movement to the right as hereinbefore explained. When the user desires to dial a number manually, he pivots the arm 65 from the dotted line position of FIG. 4 to the solid line position thereby removing the wheel 68 from the phone dial 20.

In operation, the magazine 42 having been positioned according to any conventional index means for coaction with the desired stop 34 to be sequentially engaged by the stop plunger 32, the user presses the handle 60 which releases the pawls 54 and 49 from the ratchet 45 so as to permit the cross slide 44 to move adjacent the stop 61 under the power of the spring 56 disconnecting the stop 70 from the limit switch 77 disposed in the lead 80 whereby the motor 22 is energized to rotate the crank arm or wheel 23 through its first 180° of movement whereupon the slide plunger 27 is moved to the right until the cam plunger 32 engages the stop 34 first face 35 whereupon the slide plunger 27 is released from further movement to the right and the dial 20 is permitted to rewind and register the dialed digit. Upon the motor continuing to operate and the crank arm 23 to rotate through the next 180° of motion, the dog 45 is carried into contact with the bell crank 46 after the connecting rod 26 has started its return movement to the left as seen in the drawings, whereupon the dog 45 pivots the bell cranks 46 and 47 to move the pawl 49 upwardly as seen in the drawings one incremental space coordinated to the spacing of the stops 35–41 and the keeper pawl 54 falls into position on the ratchet teeth 45 holding the cross slide 44 in that position until the next right reciprocating movement of the member 24 has been completed and the next digit dialed on the phone as per stop face 36. The device continues the movements through stops 37–41 and upon completion of these sequential movements, the stop 70 engages the limit switch 77 in the lead 80 and the power is cut off to the motor 22 thereby terminating the operation of the apparatus after the whole phone number has been dialed.

After the telephone call has been completed that device is in condition for the user to move the magazine 42 to the next number to be called as desired, whereupon by manual movement of the handle 60, the dialing of the next number is automatically effected.

In the event that the next number to be called is not a number usually called by the user, it probably will not be found in the magazine so that the user has only to move the arm 64 upwardly from the dial 20 so as to move the wheel 68 out of engagement with the aperture 69 thereby freeing the phone dial for manual operation.

Although but a single embodiment of the invention has been shown and described in detail with one attachment modification, it is obvious that many changes may be made in the size, shape, detail, and arrangements of the various elements of the invention within the scope of the appended claim.

I claim:

An automatic dialing apparatus for dial telephones comprising a bi-directionally reciprocating member adapted to be disposed between a dial telephone and a mechanism having a multiple face stop, a slide plunger slidably disposed on said reciprocating member at the dial end thereof having an inner end equipped with a ratchet tooth and an outer end, connecting means connected to said slide plunger outer end adapted to angularly move a telephone dial when said slide plunger is moved by said reciprocatnig member, a cam plunger slidably disposed in said reciprocating member at the stop end thereof adjacent said multiple face stop having an extending end adapted to engage said stop and an interal end having a cam surface; said multiple face stop being located adjacent to the extending stop end of said reciprocating member to abut said cam plunger extending end at various certain points of travel of said reciprocating member; a bifurcated tang moveably mounted on said reciprocating member for travel therewith having a pull leg and a cam leg equipped with opposed inclined surfaces; said tang pull leg inclined surface by-passing said slide plunger and tooth in a non-dialing direction of reciprocating member travel; said pull leg engaging said tooth in the dialing angular movement direction of reciprocating member travel to cause said slide plunger to angularly move said dial in the dialing direction; said bifurcated tang cam leg inclined surface when engaged by said cam plunger raising said biforcated tang to disconnect said pull leg from said slide plunger tooth to free said slide plunger from further travel with said reciprocating member to permit said slide plunger to travel in the opposite direction via said connecting means when the dial angularly reversely moves under power of its own spring upon release of said slide plunger; said multiple stop faces being distance-wise coordinated to limit the travel of said slide plunger at a point coordinated with angular movement of the dial and the digit desired to be dialed on the telephone.

References Cited in the file of this patent

UNITED STATES PATENTS

| | | |
|---|---|---|
| 1,870,547 | Wise | Aug. 9, 1932 |
| 1,917,051 | Morin | July 4, 1933 |
| 2,050,546 | Schuessler | Aug. 11, 1936 |
| 2,426,600 | Demeulenaere | Sept. 2, 1947 |
| 2,523,256 | Demeulenaere et al. | Sept. 19, 1950 |